May 15, 1928.
J. C. W. HUMFREY
1,670,197
FREE WHEEL RATCHET DEVICE
Filed March 19, 1925
3 Sheets-Sheet 1
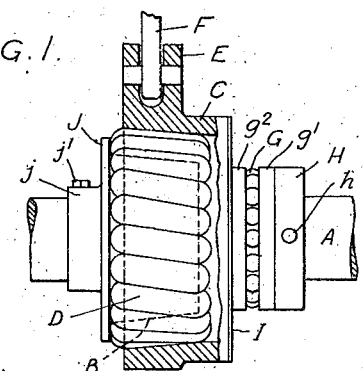
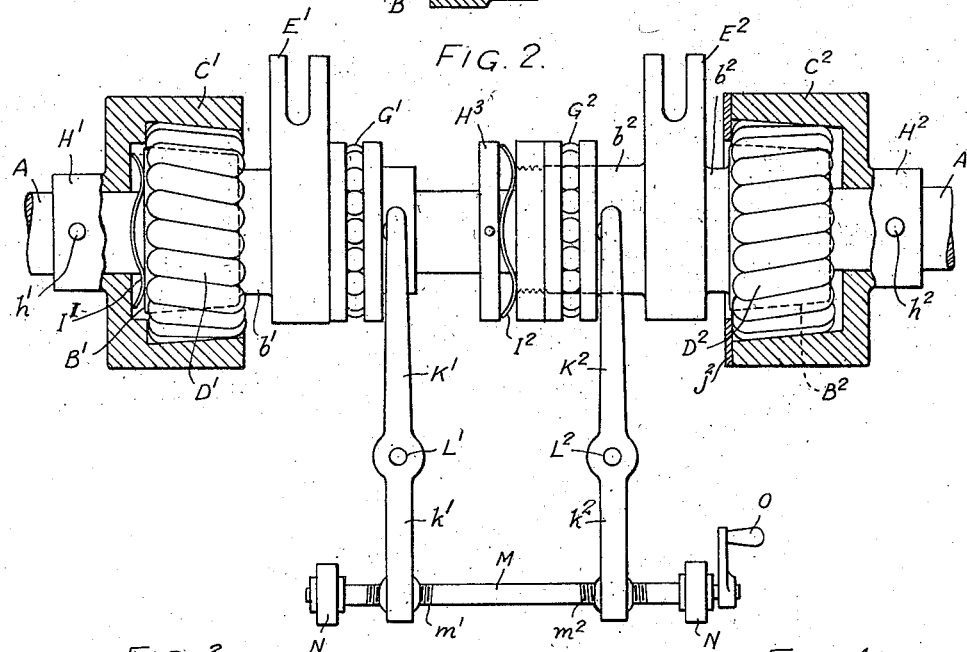
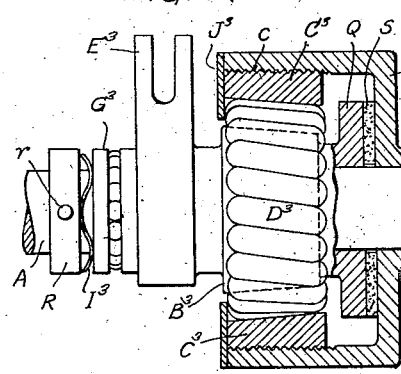
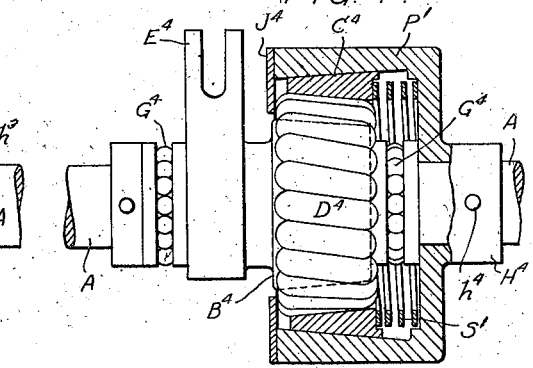
Inventor
John C. W. Humfrey
By
Attorney May 15, 1928.  1,670,197

J. C. W. HUMFREY

FREE WHEEL RATCHET DEVICE

Filed March 19, 1925   3 Sheets-Sheet 2

Inventor
John C. W. Humfrey
By
Attorney

May 15, 1928.　　　　　　　　　　　　　　　　　　1,670,197
J. C. W. HUMFREY
FREE WHEEL RATCHET DEVICE
Filed March 19, 1925　　　3 Sheets-Sheet 3
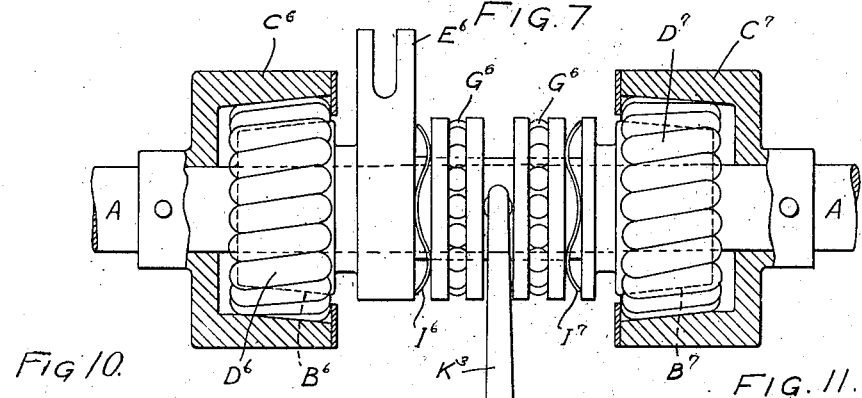
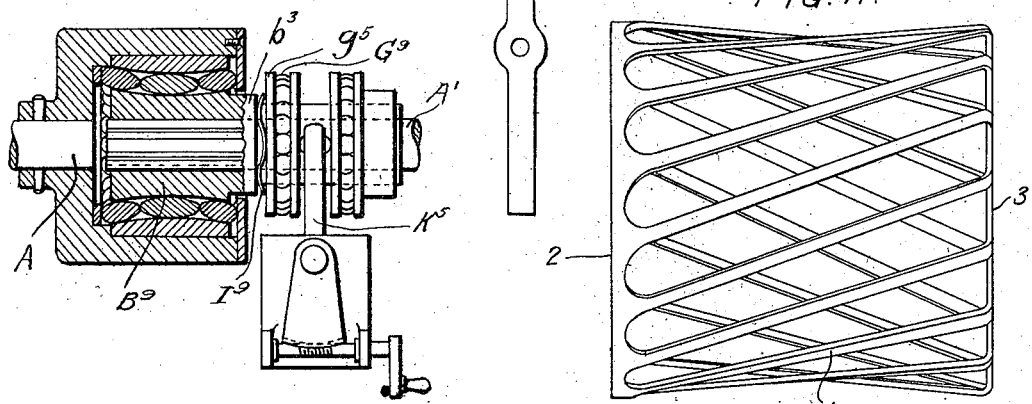
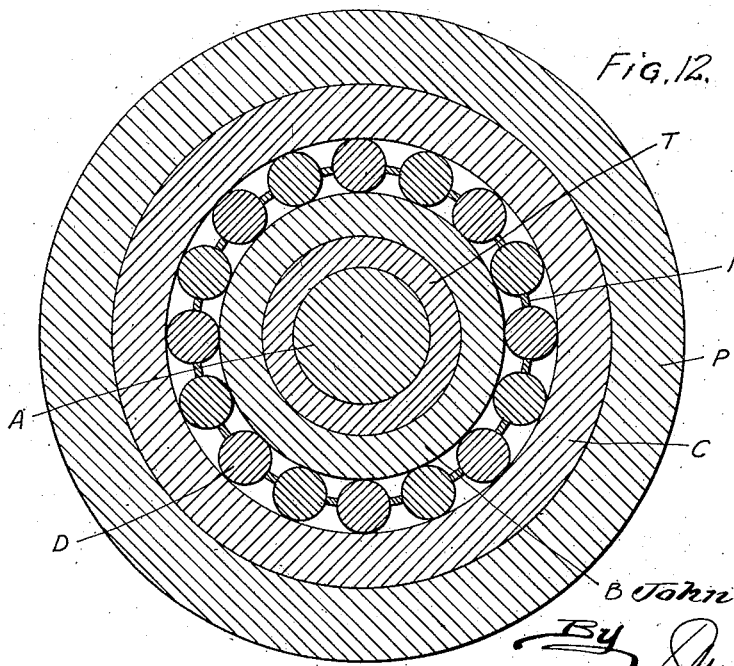

Patented May 15, 1928.

1,670,197

UNITED STATES PATENT OFFICE.

JOHN CHARLES WILLIS HUMFREY, OF LONDON, ENGLAND, ASSIGNOR, BY MESNE ASSIGNMENTS, TO THE HUMFREY-SANDBERG CO., LTD., OF LONDON, ENGLAND, A BRITISH COMPANY.

FREE-WHEEL RATCHET DEVICE.

Application filed March 19, 1925, Serial No. 16,847, and in Great Britain March 24, 1924.

The invention relates to clutch devices of the type in which movable elements, enclosed in a suitable race or channel provided between the parts to be connected or disconnected, are wedged in one direction of rotation to form a clutch rigidly coupling the parts together and in the other direction of rotation allowing free relative rotation between these parts.

According to the invention the clutch device comprises two coaxial members provided with conoidal surfaces forming between them a channel in which are inserted rollers, the axes of which are skewed relatively to the axis of the said coaxial members.

In one direction of rotation of the shaft the reaction between the driving and driven members gives rise to a frictional component in the direction of the axis of the shaft which causes a relative axial displacement between the inner and outer conoidal elements and consequently wedges the rollers between the conoids and connects them rigidly together. If the rotation is reversed, the resolved component causes a relative axial movement between the inner and outer conoids in the opposite direction so that they are unclutched. The arrangement consequently allows an oscillating movement of constant or variable amplitude to be converted into unidirectional rotational movement.

If the rollers are inserted in the race so that their axes are inclined in the opposite direction to the former case, the direction of rotation in which the wedging action takes place is also reversed.

Owing to the relative inclination between the axes of the rollers and the axis of the shaft, it is necessary, in order that the rollers should be in contact throughout their whole length with the conoidal surfaces with which they engage, that the inner conoid should be slightly concave and the outer conoid correspondingly convex; that is, the generating lines of the conoids are not straight but slightly curved, the curvature depending upon the inclination of the axes of the rollers.

In a simple construction one conoid is elastically pressed towards the larger end of the other conoid.

In a modified construction two sets of inner and outer conoid members are arranged on the same shaft, each set being provided with rollers, the inclination of the rollers in the two sets being in opposite directions and means are provided by which either set can be brought into or out of action at any time.

In a further modification two sets of inner and outer conoids are combined to form biconoidal frustums, the smallest diameter of each conoid being at the centre of the axial length of the frustums and one conoid can be displaced in either axial direction against an elastic resistance which allows full freedom of axial movement in the direction of engagement but limits the movement in the direction of disengagement.

In a still further modification the axial movement in the direction of engagement is adjusted so that the clutch will slip when the resisting torque attains a given value. This arrangement is more especially adapted to act as a clutch between two rotating shafts.

Other modifications are described and it is understood that the invention is not restricted to the examples illustrated and that various changes may be made in the form and arrangement of the parts within the scope of the invention as set out in the accompanying claims.

The accompanying drawings illustrate examples of constructions according to the invention.

Fig. 1 is an elevation, partly in section, of a clutch with a single row of rollers.

Fig. 2 is a view similar to Fig. 1 of a reversing clutch in two parts, the rollers in the two parts being inclined in opposite directions.

Fig. 3 is an elevation, mainly in section, of a compound clutch.

Fig. 4 is an elevation, mainly in section, of a modified form of compound clutch.

Fig. 7 is a sectional elevation of a further modification of a two-part reversing clutch, the rollers in the two parts being inclined in the same direction.

Fig. 10 shows a slight modification of the clutch shown in Figs. 8 and 9.

Fig. 11 shows, on an enlarged scale, a cage for containing the rollers, and

Fig. 12 is a cross-section showing the cage and rollers in their channel.

The same reference letters are used to designate similar parts in all the figures.

Figure 5:
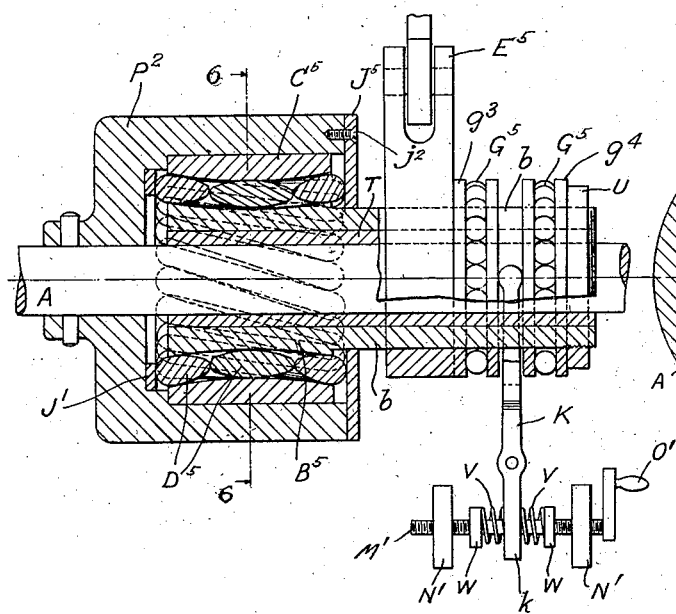
Fig. 5 is an elevation, mainly in section, of a modified form of reversing clutch.

The clutch shown in Fig. 1 is adapted to convert an oscillating movement of varying amplitude into unidirectional rotational movement.

A is the shaft to which rotational motion is to be imparted, B is an inner conoidal member secured to the shaft A, C is an outer coaxial conoidal member, the larger diameters of B and C being shown on the left of the figure. In the annular channel between the members B and C are placed cylindrical rollers D, the axes of which are inclined as shown to the common axis of the shaft and of the said conoidal members and lie on an hyperboloid of revolution. To the outer conoid C is attached a crank E which is actuated by means of a connecting rod F connected to a source of oscillatory motion.

A thrust bearing G mounted on the shaft A bears on one side $g^1$ against a collar H secured to the shaft by a pin $h$ and at the other side $g^2$ against a circular spring plate I which presses the member C towards the left, that is, into the position in which the rollers are jammed between the surfaces of the members B and C and transmit the rotary movement of the latter to the member B and shaft A.

In one direction of rotation of the outer member C, the counter clockwise direction as viewed from the right of the figure, the axial component of the frictional resistance at the rubbing surfaces of the rollers tends to force the outer member to the left, viz, into closer engagement, and in the other direction of rotation the axial component forces the outer member to the right, in which position no motion is transmitted to the shaft. The channel in which the rollers are inserted is closed at the larger end of the conoids by a removable cover plate J, a flange $j$ of which is secured to the shaft by screws $j^1$. The channel is open at the opposite end.

In the reversing clutch shown in Fig. 2, the parts are duplicated. In this example the outer conoids $C^1$, $C^2$ are secured to the shaft A by collars $H^1$, $H^2$ and pins $h^1$, $h^2$ and the inner conoids $B^1$, $B^2$ are provided with tubular extensions $b^1$, $b^2$ surrounding the shaft A and are secured to the cranks $E^1$, $E^2$ to which an oscillatory motion is imparted by the source. Thrust bearings $G^1$, $G^2$ of known type are mounted loosely on the extensions $b^1$, $b^2$ and are adapted to be moved axially in either direction by arms $K^1$, $K^2$ pivoted respectively at $L^1$, $L^2$.

The outer ends $k^1$, $k^2$ of the said arms $K^1$, $K^2$ are provided with internal threads engaging with threads $m^1$, $m^2$ on a spindle M which can be rotated in bearings N by a handle O. The threads $m^1$, $m^2$ are respectively left and right-handed, so that the said arms $K^1$, $K^2$ are moved in opposite directions. A spring $I'$ is inserted between the end of the inner conoid $B^1$ and an internal shoulder on the outer conoid $C^1$, and similarly a spring $I^2$ is inserted between a collar $H^3$ attached to the shaft and the outer end of the extension $b^2$. The larger ends of each conoid member are towards the left of the figure and the rollers $D^1$ are inclined in the opposite direction to the rollers $D^2$. A circular cover plate $J^2$ closes the open end of the member $C^2$.

If the handle O is rotated so that the thrust bearing $G^1$, and with it the inner member $B^1$, is moved to the left and the thrust bearing $G^2$ and inner member $B^2$ to the right, the outer member $C^2$ and shaft A will be rotated in one direction under the oscillatory impulses communicated to the crank $E^2$, the members $C^1$ and $B^1$ being disengaged; while if the movement imparted to the arms $K^1$, $K^2$ by the handle O is reversed, the shaft A is rotated in the opposite direction by the oscillatory impulses imparted to the crank $E^1$, the conoidal members $B^2$ and $C^2$ being out of engagement.

In the construction shown in Fig. 3 the inner conoid $B^3$ is slidable on the shaft A and is secured to the oscillating crank $E^3$, the outer conoid $C^3$ is screw-threaded at $c$ into a casing P. A collar $H^3$ on the said casing is pinned to the shaft A at $h^3$. A spring $I^3$ is inserted between the thrust bearing $G^3$ mounted loosely on the shaft A and a collar R secured to the said shaft by a pin $r$. The spring $I^3$ presses a circular flange Q on the conoid $B^3$ against a disc S of friction material inserted between the base of the casing P and the said flange.

In one direction of the oscillatory movement imparted to the crank $E^3$ the inner conoid is urged by the axial component of the frictional resistance to wedge within the outer conoid and at the same time the friction disc S is compressed and tends to transmit the drive to the casing P and through the casing to the shaft A. This effect helps to relieve the radial stresses between the inner and outer conoidal members.

In the opposite direction of the oscillatory movement imparted to the crank $E^3$, the axial component of the frictional forces moves the conoid B³ against the resistance of the spring I³ into a position in which the members B³ and C³ are out of engagement.

In the modification shown in Fig. 4, the inner member B⁴ is secured to the oscillating crank E⁴ and is prevented from axial movement by the thrust bearings G⁴, G⁴; the outer member C⁴ is free to move axially and both members can rotate freely in the unclutched position on the shaft A. In one direction of rotation the outer member will be forced to the right against the resistance of the spring S' inserted between the outer conoid C⁴ and the base of the internally coned casing P', which is pinned to the shaft A at h⁴; in this case the inner and outer conoids will rotate freely. In the opposite direction of rotation the outer member will be moved to the left and will be clutched both to the inner member B⁴ and to the outer casing P' and will rotate the shaft A.

Figure 6:
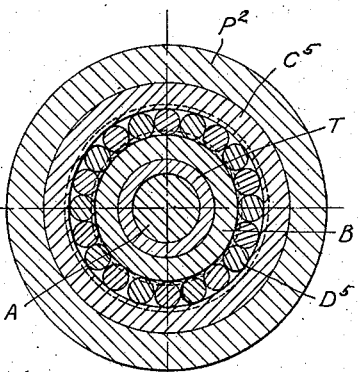
Fig. 6 is a cross-section on the line 6—6 of Fig. 5.

In the reversing clutch shown in Figs. 5 and 6, the inner and outer members B⁵ and C⁵ are formed as biconoidal frustums, the smallest diameter of their surfaces being at the centre of the axial length.

The outer member C⁵ is inserted in and secured to a casing P² and the inner member B⁵ is secured to a bearing liner T mounted loosely on the shaft A. The rollers D⁵ are retained against axial movement at one end by a plate J⁵ secured to the casing P² by screws J² and at the other end by a plate J¹ which rests against an internal shoulder of the said casing.

The inner member B⁵ is extended on the right beyond the casing P² and on this extension b is secured the crank E⁵. Ball thrust bearings G⁵ are mounted on the extension b, the disc g³ bearing against the crank E⁵ and the disc g⁴ against a nut U screw-threaded on the said extension. The arms K, spindle M' and handle O' for operating the said spindle are arranged substantially as described in connection with Fig. 2, except the spindle is screw-threaded in the bearings N' and springs V are inserted on either side of the extension k of the arms K and abut against collars W secured to the spindle M.

When the lever K is displaced to the right, the rollers D⁵ are wedged between the inner and outer conoids so that the shaft A is rotated in a clockwise direction as viewed from the right, and in the anticlockwise direction when the lever K is displaced to the left.

The arrangement allows full freedom of motion of the biconoid B⁵ in either direction of engagement.

The reversing clutch shown in Fig. 7 is similar to that shown in Fig. 2 except that the rollers D⁶, D⁷ are inclined in the same direction and the larger ends of the conoids B⁶, B⁷ and C⁶, C⁷ are opposite to one another. Only one crank E⁶ is required and according to the position given to the arms K³ either the member C⁶ or the member C⁷ is clutched to the inner member B⁶ or B⁷ when the crank E⁶ rotates in one direction and is released when the crank rotates in the reverse direction.

Figure 8:
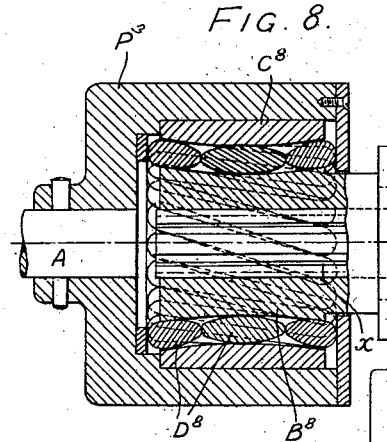
Figs. 8 and 9 are, respectively, a sectional elevation and an end view of a modification adapted for clutching two shafts together.
Figure 9:
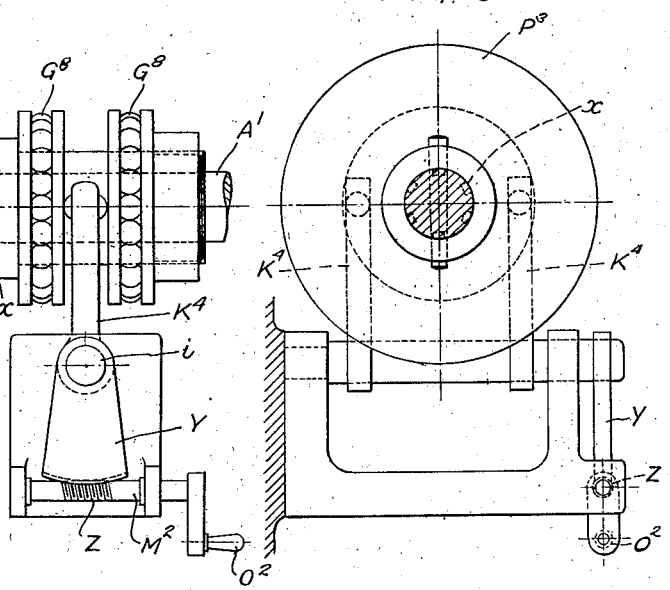

The construction shown in Figs. 8 and 9 is also of the biconoidal type and is especially adapted as a clutch between two rotating shafts A and A¹.

By limiting the axial movement of the displaceable member in the direction of engagement, the clutch will slip when the resisting torque attains a certain value. By varying the limits of the axial movement the clutch can be adjusted to slip at any required value of the torque. Power can still be transmitted through the clutch while it is slipping, but a certain proportion of the power of the prime mover is absorbed in the clutch and wasted in heat. This property renders it very useful for starting the driven shaft under load.

During a period when the clutch is slipping, one or both the elements of the clutch must slip over the surfaces of the rollers, but the rollers are at the same time caused to rotate about their own axes. Thus if the clutch is filled or fed with a lubricant the rotation of the rollers will ensure that the slipping surfaces are continuously changing and are constantly supplied with lubricant.

The frictional forces between lubricated surfaces are a function of their relative velocities, and after a short period, in which the forces coupling the members are less than the static resisting torque, tend to increase as the relative velocity increases. Thus for a given amount of engagement there will be, in dependence on the resisting torque offered by the driven member, varying amounts of slip and hence varying ratios between the angular velocities of the driving and driven shafts.

When the driven member offers a resisting torque but slightly greater than that at which the clutch is set to slip, the amount of slip will be small, but as this resistance is gradually increased the slip becomes correspondingly greater until a limit is reached when no motion is transmitted to the driven member. For easy adjustment of the clutch there is consequently a range of resisting torques through which combined slip and drive can take place.

A is the driving shaft connected to a prime mover and A¹ is the driven shaft. The construction of the biconoids B⁸ and C⁸, of the casing P³ and the thrust bearings G⁸ is the same as in the arrangement described in connection with Figs. 5 and 6, except that the bearing liner of the inner conoid is in this case omitted and the said conoid is keyed to the shaft $A^1$ by splines $x$, thus permitting movement of the inner conoid axially of the shaft A but preventing relative rotation between the inner conoid and the shaft $A^1$.

The arms $K^4$ are pivoted at $i$ and their outer extension is formed as a toothed quadrant Y engaging with a worm Z on the spindle $M^2$ so as to be held positively in any required position.

The operation of the clutch is as follows:—

When the spindle $M^2$ is set so that the biconoidal members $B^8$ and $C^8$ are in the mean position in which their smallest diameters are opposite each other, the shafts A and $A^1$ are free to turn relatively to one another in either direction since in this position there is no wedging action on the rollers. If the worm Z is operated so as to move the inner member $B^8$ towards the left, the shaft A can drive the shaft $A^1$ in a clockwise direction as viewed in Fig. 9. If the inner member $B^8$ is moved towards the right, the shaft A can drive the shaft $A^1$ in the opposite or anti-clockwise direction. To every position into which the inner member $B^8$ is moved and held on either side of its mean position, there corresponds a definite resisting torque at which slip will commence, but, as explained above, if lubrication is applied to the clutch, a greater torque than that at which slip commences can still be transmitted, the shaft A revolving at a higher speed than the shaft $A^1$ and the rollers $D^8$ revolving and slipping over one or both conoidal surfaces.

In the modification shown in Fig. 10 a spring $I^9$ is inserted between the shoulder $b^3$ of the biconoid $B^9$ and the disc $g^5$ of the thrust bearing $G^9$.

This modification allows the clutch to be used with its normal drive and slip in one direction only (e. g. in the clutch shown in the clockwise direction) and the shaft $A^1$ will be capable of free-wheeling with respect to the shaft A. That is to say, if the prime mover attached to A be slowed down, $A^1$ can continue to revolve under its own inertia, the axial thrust on the member $B^9$ changing in direction and tending to release the clutch against the resistance of the spring. The flexibility of the spring must not be such as to allow the member $B^9$ to move past its central position, since if this occurs the shaft $A^1$ will tend to drive the shaft A. But this reverse drive can be obtained at any time should it be required, e. g. for the purpose of using the prime mover as a brake, by moving the arms $K^5$ to the right. Since the amount of engagement of the clutch when working with the member $B^9$ to the left of its mean position is now elastically instead of positively controlled, there can be no adjustment for various degrees of slip, but direct engagement will tend to take place immediately the shaft A drives the shaft $A^1$.

The mechanism according to the invention has the following properties:—

If only single conoidal surfaces are provided, one of which is given a positive control in the direction of engagement and a flexible control in the direction of disengagement, it will act as a unidirectional free-wheel clutch which can be adjusted to give any desired degree of slip under various resisting torques.

When provided with biconoidal surfaces having positive adjustable stops for both directions of axial movement, it will act as a clutch driving in either direction and capable of adjustment for slip in either direction.

When provided with biconoidal surfaces having a positive adjustable stop for one direction of axial movement and a flexible stop for the opposite direction of movement, it will act as a clutch driving in either direction, capable of slip and of free-wheeling in one direction and of direct engaging without slip in the other direction.

The rollers may be contained in a sheet metal cage 1 as shown in Figs. 11 and 12, the cage being closed at the end 2 and open at the end 3.

Having thus described the nature of my said invention and the best means I know of carrying the same into practical effect, I claim:—

1. A clutch comprising in combination coaxial conoidal members and rollers, the axes of which are skewed relatively to the common axis of the said members, said rollers being inserted in an annular channel provided between the conoidal surfaces of the said members.

2. A clutch comprising in combination coaxial conoidal members, the opposite surfaces of which are, respectively, concave and convex, and cylindrical rollers, the axes of which are skewed relatively to the common axis of the said members, said rollers being inserted in an annular channel provided between the conoidal surfaces of the said members.

3. A clutch comprising in combination coaxial conoidal members and rollers, the axes of which are skewed relatively to the common axis of the said members, said rollers being inserted in an annular channel provided between the conoidal surfaces of the said members, one of said surfaces being concave and the other convex.

4. A clutch comprising in combination coaxial conoidal members and rollers, the axes of which are skewed relatively to the common axis of the said members, said rollers being inserted in an annular channel provided between the conoidal surfaces of the said members, one of said conoidal members being slidable along the said common axis.

5. A clutch comprising in combination a shaft, a conoidal member coaxial with said shaft and secured thereto, a second conoidal member rotatable about the axis of said shaft and coaxial therewith, the opposite surfaces of said conoidal members being, respectively, concave and convex, and rollers, the axes of which are inclined to the common axis of the said conoidal members, inserted in an annular channel provided between the conoidal surfaces of the said members.

6. A clutch comprising in combination a biconoidal outer member and a coaxial biconoidal inner member and rollers, of which the axes are skewed relatively to the common axis of the said biconoidal members, said rollers being inserted in a channel provided between concave and convex surfaces of the said members.

7. A clutch comprising in combination a biconoidal outer member, a biconoidal inner member coaxial therewith, the smallest section of each of said biconoidal members being at the center of its axial length, and rollers in the channel between the concave and convex surfaces of said members and skewed relatively to the common axis of said biconoidal members.

8. A clutch comprising in combination a shaft, a biconoidal outer member and a coaxial biconoidal inner member, one of said members being secured to the said shaft and the other of said members being slidable axially, and rollers of which the axes are skewed relatively to the axis of said shaft, said rollers being inserted in an annular channel provided between the adjacent surfaces of said biconoidal members.

9. A clutch comprising in combination a shaft, a biconoidal member and a coaxial biconoidal inner member, the outer of said members being secured to said shaft and the inner of said members being movable axially of said shaft, and rollers of which the axes are skewed relatively to the axis of said shaft, said rollers being inserted in an annular channel provided between the adjacent surfaces of said biconoidal members.

10. A clutch comprising in combination a shaft, a biconoidal member and a coaxial biconoidal inner member, the outer of said members being secured to said shaft and the inner of said members being movable axially of said shaft, rollers of which the axes are skewed relatively to the axis of said shaft, said rollers being inserted in an annular channel provided between the adjacent surfaces of said biconoidal members, said inner member having an axial extension, and means associated with said extension for moving said inner member axially in either direction.

11. A clutch comprising in combination a shaft, a biconoidal member and a coaxial biconoidal inner member, the outer of said members being secured to said shaft and the inner of said members being movable axially of said shaft, rollers of which the axes are skewed relatively to the axis of said shaft, said rollers being inserted in an annular channel provided between the adjacent surfaces of said biconoidal members, said inner member having an axial extension, means associated with said axial extension for moving said inner member axially in either direction, and means for holding said inner member in any required axial position.

12. A clutch comprising in combination a shaft, a biconoidal member and a coaxial biconoidal inner member, the outer of said members being secured to said shaft and the inner of said members being movable axially of said shaft, rollers, the axes of which are skewed relatively to the axis of said shaft, said rollers being inserted in an annular channel provided between the adjacent surfaces of said biconoidal members, an axial extension of said inner member, means associated with said extension for moving said inner member axially in either direction, said last named means comprising shoulders on said axial extension, a pivoted arm engaging between said shoulders and manually operated means for rocking said pivoted arm and holding it in the required position.

13. A clutch comprising in combination a shaft, a biconoidal member and a coaxial biconoidal inner member, the outer of said members being secured to said shaft, and the inner of said members being movable axially of said shaft, rollers of which the axes are skewed relatively to the axis of said shaft, said rollers being inserted in an annular channel provided between the adjacent surfaces of said biconoidal members, said inner member having an axial extension, means associated with said axial extension for moving said inner member axially in either direction, means for holding said inner member in any required position, and an elastic resistance permitting slight axial movement of said inner member in one direction.

In testimony whereof I have signed my name to this specification.

JOHN CHARLES WILLIS HUMFREY.